May 21, 1957 R. W. SANFORD 2,792,878
JACK ACTUATED TIRE REMOVER WITH CIRCUMFERENTIALLY
DISTRIBUTED THRUST AND PULL MEMBERS
Filed April 12, 1955 2 Sheets-Sheet 2

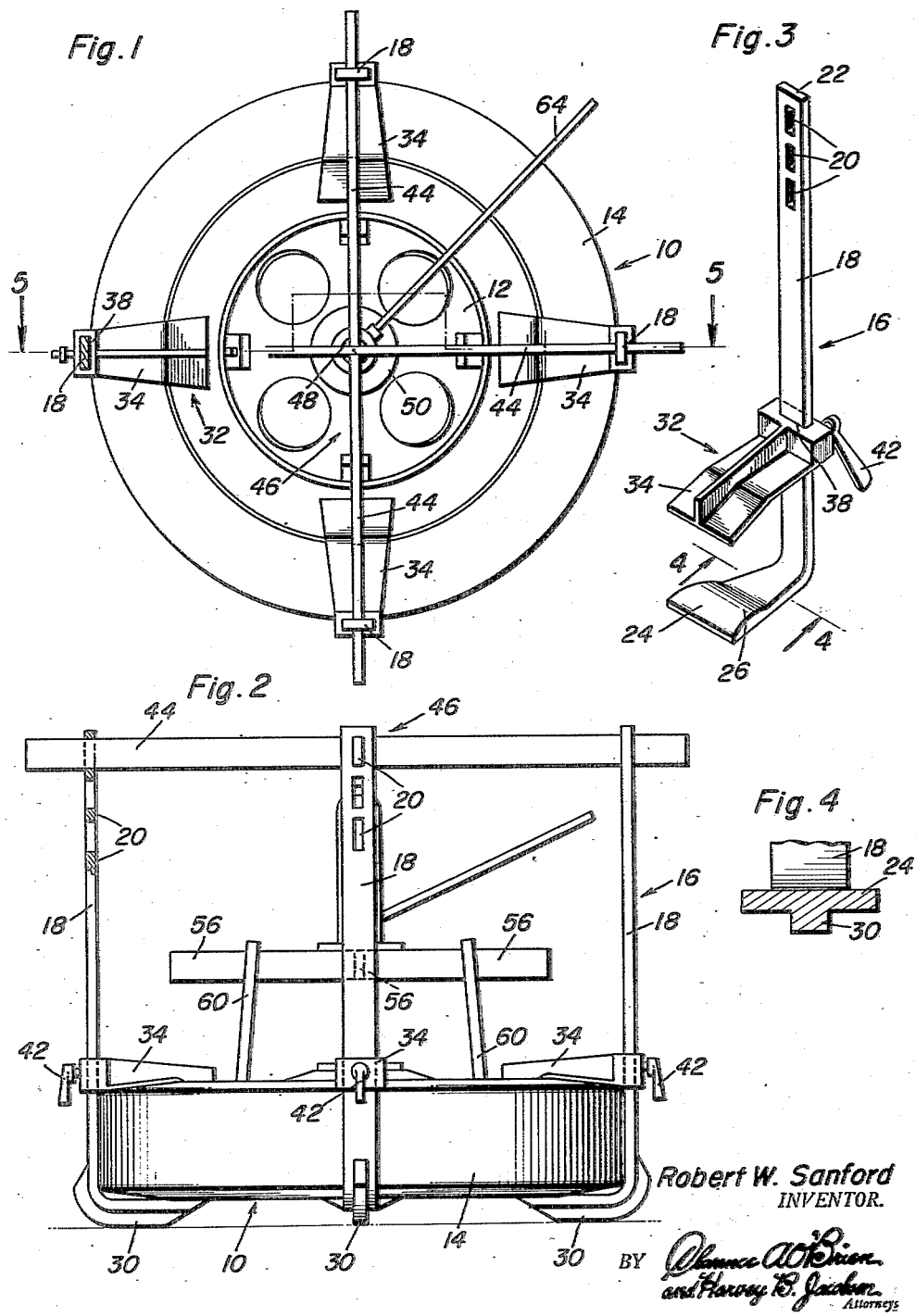

Robert W. Sanford
INVENTOR.

United States Patent Office 2,792,878
Patented May 21, 1957

2,792,878

JACK ACTUATED TIRE REMOVER WITH CIRCUMFERENTIALLY DISTRIBUTED THRUST AND PULL MEMBERS

Robert W. Sanford, Seminary, Miss.

Application April 12, 1955, Serial No. 500,908

2 Claims. (Cl. 157—1.2)

This invention relates generally to an apparatus utilized in disassembling tires from wheel assemblies, and is more particularly concerned with providing a readily useable assembly for disassembling heavy-duty tires from the wheels upon which they are mounted.

A further object of invention in conformance with that set forth above is to provide a relatively inexpensive and highly efficient heavy-duty tire removing assembly which requires relatively little effort and skill in order to be used efficiently.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of the assembly positioned to be used with parts broken away for clarity;

Figure 2 is a front elevational view of the assembly shown in Figure 1;

Figure 3 is a perspective view of one of the support or foot elements of the assembly;

Figure 4 is an enlarged sectional view taken substantially on line 4—4 of Figure 3;

Figure 5:
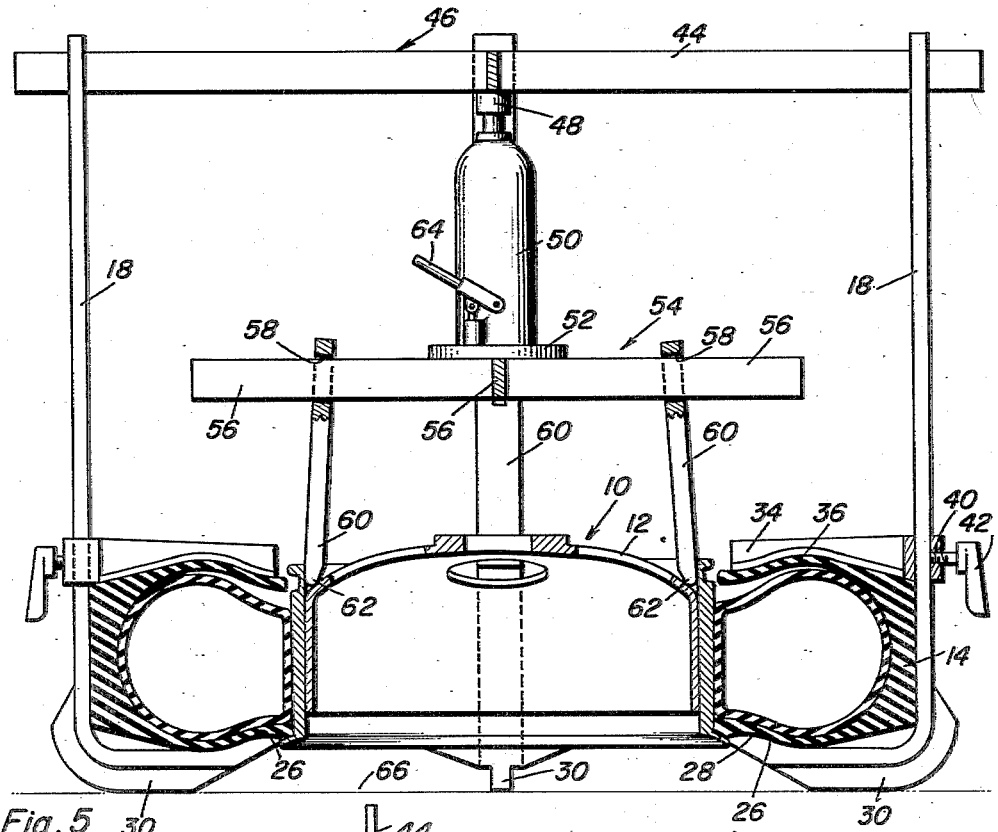
Figure 5 is an enlarged sectional view taken substantially on line 5—5 of Figure 1.
Figure 6:
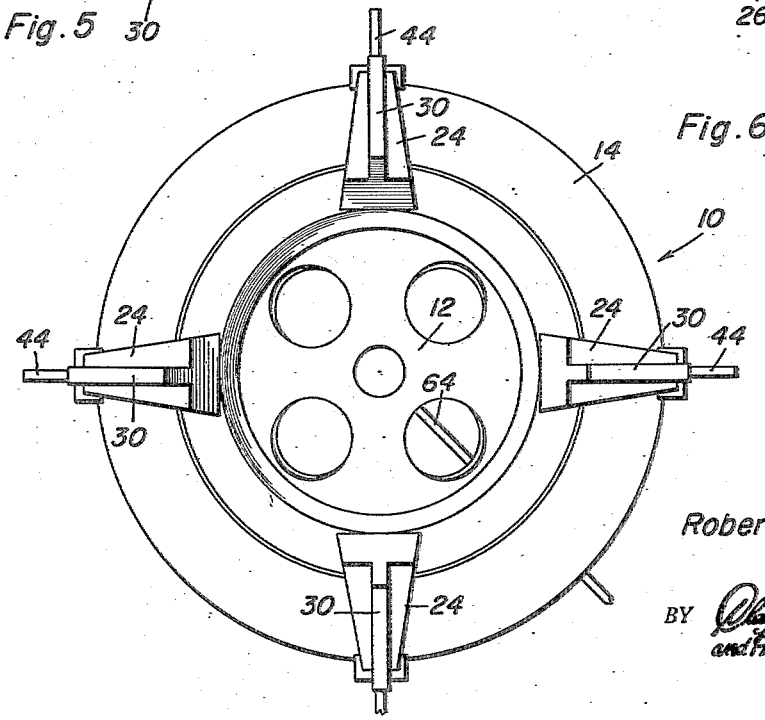
Figure 6 is a bottom plan view of the novel assembly.

Indicated generally at 10 is a tire and wheel assembly which includes the inner rim 12 and the outer tire and rim portion 14. In larger tire and wheel assemblies the tire and outer rim portions become "frozen" together and it becomes very difficult to disassemble these parts.

Indicated generally at 16, and shown most clearly in Figure 3, is a foot or support element which includes a vertical portion 18 which includes a plurality of vertically disposed slotted portions 20 adjacent the upper end 22, a lower end including a foot portion 24. The foot portion 24 is at right angles to the vertical portion 18 and includes on its upper surface upwardly curved portion 26 which conforms to the curved side wall portion 28 of a tire, as seen in Figure 5, the lower surface of the foot portion including a downwardly extending rib or reinforcing flange 30.

Vertically adjustable on the portions 18 of the support element 16 are holding elements 32 which include a horizontal portion 34 extending over the lower foot portion 24 including a curved inner surface 36 conforming to the opposite side wall portion of the tire, as seen in Figure 5. The holding elements are for engaging and holding the tire securely in place in case the tire begins to warp or roll when pressure is applied while the rim is being pushed from the tire. The holding element including a transverse slotted portion 38 through which the vertical portion of the foot element extends, and the holding element also including a horizontal threaded bore 40 into which is threadedly secured a locking handle 42 for securing the horizontal holding element 34 on the side of a tire of a tire and wheel assembly, as seen for example in Figures 2 and 5.

As previously mentioned each of the vertical portions 18 of the support element 16 include a plurality of vertically disposed elongated apertures 20. The apertures 20 provide for an adjustment of the distance between upper and lower cross members 46 and 54, to accommodate different jacks, each of the apertures having inserted therein a leg 44 of an upper cross member 46 and provides an abutment for the head 48 of a jack 50.

The base 52 of the jack rests upon a lower support cross member 54 which includes the right angularly related leg elements 56 which extend through vertical slots 58 of the foot elements 60. The foot elements 60 include a lower rounded portion 62, the foot elements 60 being adjustable along the arms 56 so that the portion 62 may be inserted between the inner rim 12 and the outer tire and rim assembly 14.

The jack 50 is actuated by a conventional handle 64, or a jack utilizing an air pressure line may be utilized, and after the foot elements 16 have been implaced upon the tire mounted on a rim from which the lock ring has been removed, as seen in Figure 5, for example, and the holding elements 32 have been secured in position, the jack having been positioned between the cross members 46 and 50 after being expanded causes the foot element 60 to be urged downwardly against the rim 12 for pushing the same from the tire. The ribs 30 on the lower portion of the feet 24 of the foot element 16 are of sufficient height to support the tire and wheel assembly above the ground and permit sufficient clearance in order that the rim can be pushed toward the support surface 66.

Thus it is believed readily apparent there has been disclosed a tire remover assembly fully conforming with the objects of invention heretofore set forth.

Various positional directional terms such as "top," "bottom," etc. are utilized herein to have only a relative connotation to aid in describing the device and are not intended to be interpreted as requiring any particular orientation in respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A device for disassembling a tire rim from a tire and wheel assembly including a plurality of foot elements, each of said foot elements including a foot portion for engaging the side wall portion of a tire and an upwardly extending vertical support portion, a plurality of holding elements vertically adjustable on said vertical support portion of said foot elements for engaging the opposite side wall portion of a tire, an upper jack supporting member adjustably carried by upper end portions of said vertical support portions, a lower jack member including an arm and spaced feet slidably adjustably carried by said arm, said feet being engageable with the rim of a tire and wheel assembly of said tire, and a jack secured to and extendible between the upper and lower jack members for urging said upper and lower jack members apart to separate said rim from said tire.

2. A device for disassembling a tire rim from a tire and wheel assembly including a plurality of foot elements, each of said foot elements including a foot portion for engaging the side wall portion of a tire and an upwardly extending vertical support portion, a plurality of holding elements vertically adjustable on said vertical support portion of said foot elements for engaging the opposite side wall portion of a tire, an upper jack supporting member adjustably carried by upper end portions of said vertical support portions, a lower jack member including an arm and spaced feet slidably adjustably carried by said arm, said feet being engageable with the rim of a tire and wheel assembly of said tire, and a jack secured to and extendible between the upper and lower jack members for urging said upper and lower jack members apart to separate said rim from said tire, and upper end portions having a plurality of vertically spaced slots therethrough, said upper jack supporting member having a cross member with arms extending into selected ones of said slots.

References Cited in the file of this patent

UNITED STATES PATENTS

| | | |
|---|---|---|
| 1,353,078 | Smith | Sept. 14, 1920 |
| 2,043,169 | Hawkinson | June 2, 1936 |
| 2,345,346 | Larson | Mar. 28, 1944 |
| 2,615,506 | Wilson | Oct. 28, 1952 |